United States Patent [19]

Suzuki et al.

[11] 4,178,085
[45] Dec. 11, 1979

[54] PHOTOGRAPHIC CAMERA WITH A RELEASE LOCKING DEVICE

[75] Inventors: Masayuki Suzuki, Kawasaki; Tadashi Ito, Yokohama; Masayoshi Yamamichi, Kawasaki; Hiroyasu Murakami, Tokyo, all of Japan

[73] Assignee: Canon Kabushiki Kaisha, Tokyo, Japan

[21] Appl. No.: 780,018

[22] Filed: Mar. 22, 1977

[30] Foreign Application Priority Data

Mar. 31, 1976 [JP] Japan ............................ 51/35739

[51] Int. Cl.² ..................... G03B 7/08; G03B 17/38
[52] U.S. Cl. ............................ 354/60 R; 354/234; 354/268
[58] Field of Search ............ 354/60 R, 234, 235, 354/266, 267, 268, 238

[56] References Cited

U.S. PATENT DOCUMENTS

| | | | |
|---|---|---|---|
| 3,367,251 | 2/1968 | Furuta | 354/60 R |
| 3,693,524 | 9/1972 | Furuta | 354/60 R X |
| 3,964,075 | 6/1976 | Ohtaki et al. | 354/60 R X |
| 4,003,063 | 1/1977 | Takahashi et al. | 354/60 R X |

Primary Examiner—Michael L. Gellner
Attorney, Agent, or Firm—Toren, McGeady and Stanger

[57] ABSTRACT

A release locking device for use in photographic cameras of the type in which an exposure meter and electromagnetic actuating and releasing means for automatic exposure control are rendered operative in separate manner by their respective control or release switches as may be operatively associated with a display button and a shutter release button respectively. This device comprises a master switch connected between an electrical power source and a common input lead of these release switches to be closed and opened in response to an actuation and a release, respectively, of a manually operable member, thereby all of the release switches are rendered effective and ineffective at a time. In a preferred embodiment, this device is operatively associated with a shutter cocking mechanism to be actuable in automatic response to a protracting movement of the shutter cocking lever into an effective range of shutter cocking operation.

3 Claims, 5 Drawing Figures

PHOTOGRAPHIC CAMERA WITH A RELEASE LOCKING DEVICE

DETAILED DESCRIPTION OF THE INVENTION

This invention relates to photographic camera, and more particularly to a camera having an exposure meter and electro-magnetic actuating and releasing means for automatic exposure control rendered operative in selective manner. Still more particularly, it relates to a release locking device for use in such a camera.

Up-to-date cameras are generally characterized by having the various control mechanisms electrically operated to perform automatic adjustment of exposure control and the like. Introduction of recently important technological advances in electronics to such an electrically operated exposure control system have made it possible for the camera to select a battery of very small size and small capacity for employment as the electrical power source. This battery may be of the silver oxide power cell, or mercury cell type which is characterized by a very small electrical capacity as compared with the ordinary dry cell. Most recently developed cameras are, however, provided with more complicated automatic exposure control circuit. In addition thereto, there is further provided a photographic information display circuit with power supply from the common battery of the exposure control circuit. Thus, the considerably increased load on the battery is to lead to a premature consumption of the energy of the battery.

In order to avoid such defect, various solutions have been proposed. According to one proposal, the power supply is programmed so that each individual circuit section is rendered energized for a period of time slightly longer than that necessary to perform that part of the exposure control operation which is assigned to that circuit section, whereby the consumption of the electrical energy can be minimized. In this case, as the power supply program begins with energization of a shutter release electro-magnet, it is necessary to provide a separate release switch arranged to be manually actuable from the outside of the camera housing for establishing power supply to an exposure meter serving as an exposure value display means for as long as desired prior to the making an exposure.

With the camera having such a power supply program, therefore, in order to prevent accidental release, it is required that the shutter release button which is operatively associated with a release switch to start an exposure operation must be provided with a locking mechanism. On the other hand, the exposure meter, though its energy consumption being relatively small, is usually protected by providing an additional locking mechanism as operatively associated with the pre-view button therefor, or otherwise the accidental energy consumption will amount up to a considerably large level. Because of the necessity of separate release and actuation of these two locking mechanisms, the photographer will miss a shutter chance for those of photographic situations which may be encountered with rapid preparation of the camera.

An object of the present invention is to prevent a premature consumption of the electrical energy of a battery in a camera having the various control mechanisms electrically operated.

Another object of the invention is to provide a release locking device for use in photographic cameras of the type in which an exposure meter and electromagnetic actuating and releasing means for automatic exposure control are rendered operative in separate manner through their respective control or release switches, thereby both of these release switches can be rendered effective and ineffective at a time.

Still another object of the invention is to arrange the release locking device relative to a shutter cocking mechanism so that, upon protracting movement of the shutter cocking lever into an effective range of cocking operation, the aforesaid release switches are rendered effective at a time.

These and other objects and features of the present invention will become apparent from the following detailed description taken in conjunction with the accompanying drawings.

Figure 1:
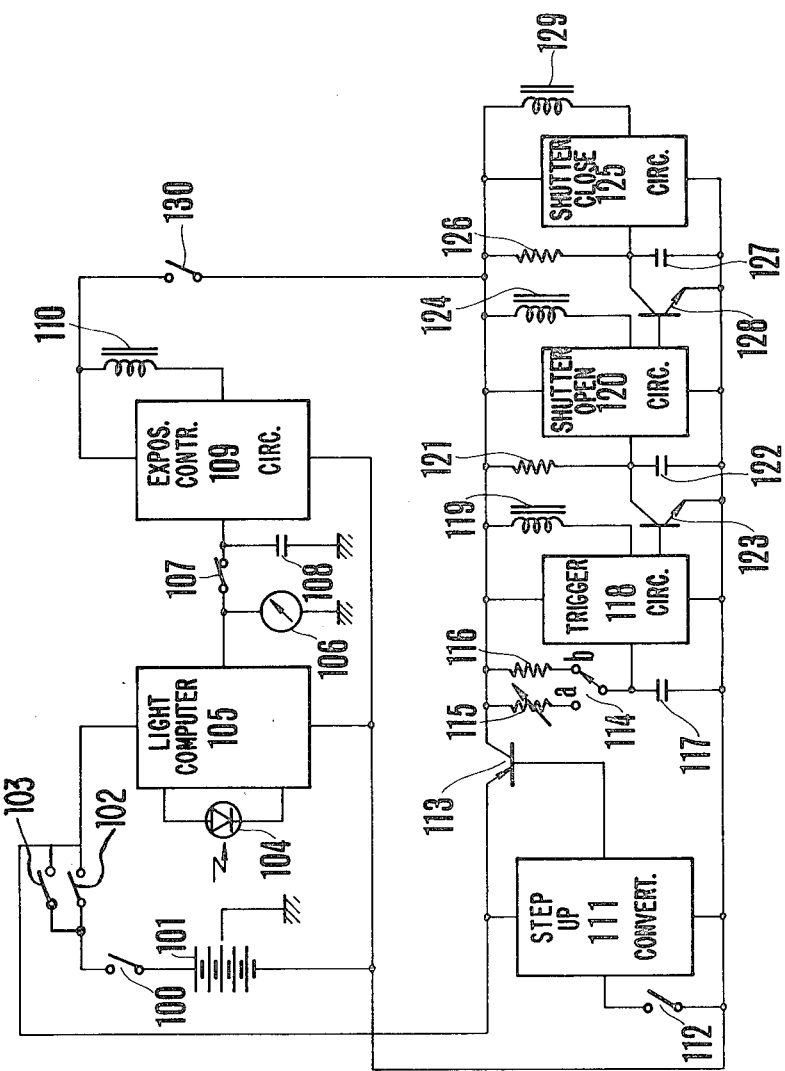
FIG. 1 is a schematic circuit diagram, partly in block form, of one embodiment of a release locking device according to the present invention as applied to a single lens reflex camera having an exposure meter with electro-magnetically operated actuating and releasing means for power supply program and for automatic exposure control.

The circuit shown in FIG. 1 comprises a light metering circuit 104 to 106 and a power supply programming and exposure control circuit 107 to 130 connected to a common power source or battery 101 through respective control or release switches 102 and 103 operatively associated with a shutter release button not shown and a pre-view button not shown respectively. Connected between the battery 101 and a common input lead of the release switches 102 and 103 is a master switch 100 constituting part of the release locking device of the present invention.

Upon closure of the master switch 100, as a photosensitive element 104 receives light coming from a scene to be photographed and entering through an objective lens of the camera, a computer 105 produces an output signal representative of an exposure value which is displayed by a meter 106 so long as the pre-view button is depressed to close switch 102. Thereafter, the photographer may turn to depression of the shutter release button, thereby not only the switch 103 but also a switch 112 is closed. When switch 112 is closed, a transistorized converter 111 is actuated to produce not only a higher voltage than that of battery 101 but also a gating control signal which is applied to the base electrode of a transistor 113 connected in a power supply circuit. Conduction of transistor 113 is followed, after a time interval depending upon the selected time constant of a switchable delay circuit having a self-timer setting variable resistor 115, a normal operation setting resistor 116, a timing capacitor 117, and a switch 114, by actuation of a first trigger circuit 118 which results in energization of the solenoid of an electro-magnet 119 controlling sequential movements of a lens aperture mechanism and a reflex mirror with simultaneous occurrence of conduction of a shunt transistor 123. As shunt transistor 123 is connected across a timing capacitor 122, a second trigger circuit 120 is actuated in a time interval dependent upon the time constant of the timing circuit 121, 122 to energize the solenoid of an electro-magnet 124 controlling opening movement of the shutter, and also to cause conduction of a shunt transistor 128 connected across a timing capacitor 127. At the termination of duration of an exposure time, a third trigger circuit 125 is actuated to energize the solenoid of an electromagnet 129 controlling closing movement of the shutter.

When the camera is switched from the diaphragm preselection automatic exposure range to the shutter preselection automatic exposure range, a switch 130 is closed, causing an automatic diaphragm control circuit 107 to 110 to be rendered operative.

Referring to FIGS. 2 to 5, there is shown the mechanical structure of the release locking device of the invention as operatively associated with a shutter cocking and film winding-up mechanism of the camera. The film winding-up mechanism includes a shaft 1 having a collar 2 fixedly secured to the top end thereof, the opposite end of which is drivingly connected to a not shown suitable take-up reel through some suitable one-way clutch mechanism not shown, and rotatably mounted in a bushing 17 fixedly connected to the camera housing 16, and a winding lever extending radially outwardly from an annular carrier 5 secured in coaxially shiftable relation to the shaft 1 by a fastener 3 which is affixed to the shaft 1. Positioned between the head of fastener 3 and the upper surface of the carrier 2 is a friction spring 4. In order to transmit torque of the winding lever to the shaft 1 while permitting a playing movement of the lever between retracted and protracted positions beyond an effective range of shutter cocking and film winding operation, there is provided a post 6 eccentrically and downwardly extending from the carrier 5 into a cutout 2a formed in a circumferential portion of the collar 2.

Figure 4:
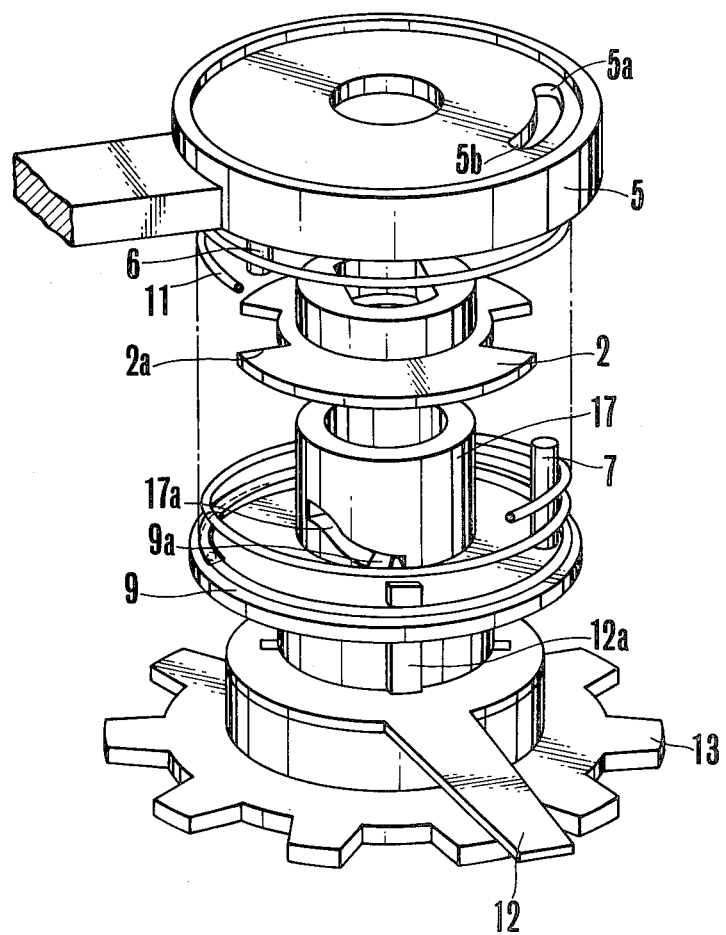
FIG. 4 is an exploded perspective view of the mechanism of FIGS. 2 and 3.

The release locking device of the invention comprises a disc 9 rotatably mounted on the bushing 17 and having a pair of projections 9a and 9b displaced by 180° from each other and extending radially inwardly into respective camming grooves 17a and 17b of partial helix configuration, so that upon clockwise movement of a release locking lever or handle 12 as viewed in FIG. 4, the disc 9 is shifted upwards against the force of a tensile helical spring 11, as the handle 12 is drivingly connected to the disc 9 through a pair of tag members 12a and 12b displaced by an angular distance of 180° from each other and extending perpendicularly upwardly from a handle 12-carrying ring rotatable about the common axis of the shaft 1 through respective camming holes provided in the disc 9, while permitting the handle 12 to remain unchanged in the longitudinally spaced relation to the upper panel 8 of the camera housing during the release locking and actuating process. The disc 9 fixedly carries a gear 13 in coaxial relation thereto which in turn fixedly carries a movable contact member A of the master switch 100 of FIG. 1 arranged to be brought into and taken out of electrical engagement with a fixed contact in the form of a pair of arcuate conductive tracks, c, and, d, printed on an insulating substrate 14 fixedly mounted through a flexible plate 15 to the camera housing, when the handle 12 is released from the locked position and actuated thereto respectively.

Figure 2:
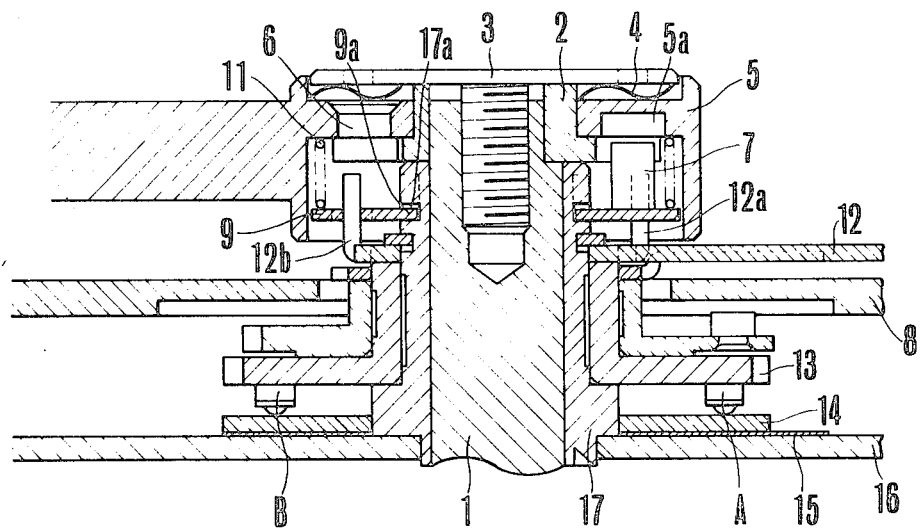
FIG. 2 is a sectional view showing an example of the construction and arrangement of the basic parts of the release locking device of the present invention as operatively associated with a film winding mechanism in the released position.
Figure 3:
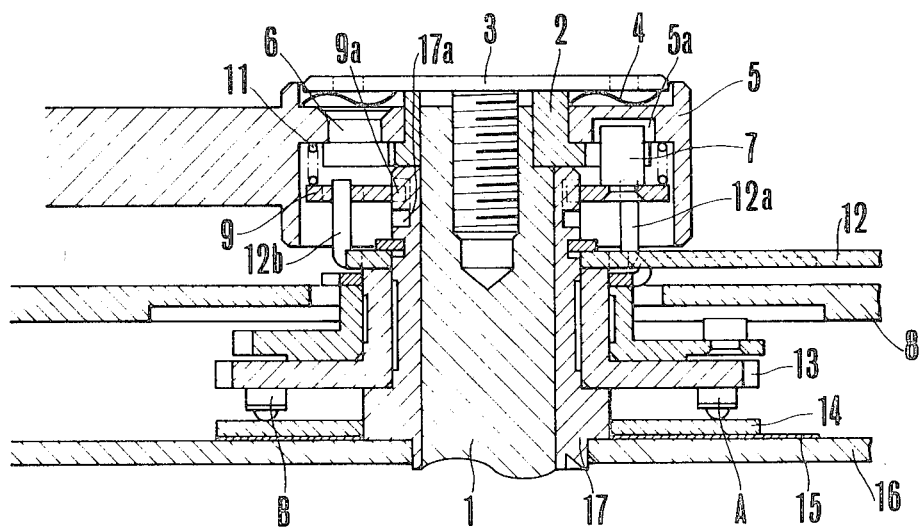
FIG. 3 is a similar view with the release locking device set in the locked position.

In order for the master switch 100 to be made closed in automatic response to operation of the winding lever, there is provided a stud 7 extending eccentrically upwardly from the disc 9 through a cutout of the collar 2 and having a length so adjusted that the top end of stud 7 reaches an arcuate slot 5a provided through the wall of the carrier 5 as shown in FIG. 3 only when the disc 9 is in the advanced positions where the master switch 100 is open. The slot 5a is so dimensioned and so oriented that the winding lever is moved for play from the most retracted position to the effective range of winding operation, the disc 9 can be automatically turned counterclockwise through the stud 7-and-slot end 5b connection to the position shown in FIG. 2 where the stud 7 is completely disengaged from the slot 5a, while being simultaneously driven for downward movement under the action of spring 11, thereby the master switch 100 is automatically closed.

The operation of the release locking device of the invention will next be explained in connection with the operation of the shutter cocking and film winding mechanism. After having completed the final cycle of winding operation, the photographer may set the winding lever in the retracted position, and then turn the handle 12 of the release locking device in the clockwise direction as viewed in FIG. 4, thereby the disc 9 is moved in a combined clockwise and upward direction as guided through the projection 9a, 9b-and-spiral camming groove 17a, 17b connection against the force of spring 11, while the stud 7 being permitted to enter the slot 5a of the carrier 5, with the resulting position being shown in FIG. 3, where the movable contact member A of the master switch 100 is disengaged from the conductive tracks, c, and, d, as it is lifted off from the substrate 14. In this state, even when the release switches 101 and 102 are accidentally overlooked in the closed positions, no electrical energy is caused to vainly leak out of the battery 101.

Figure 5:
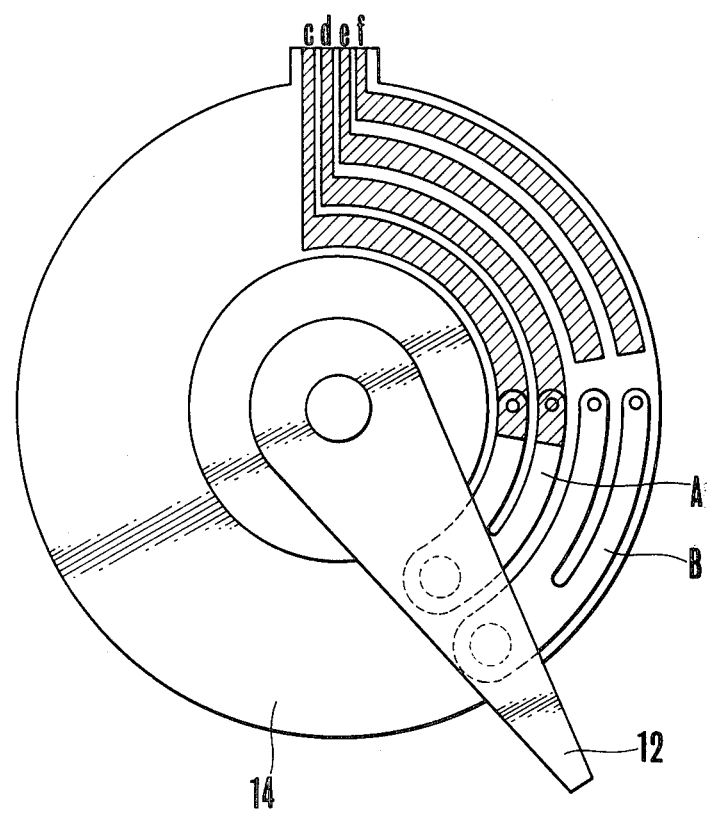
FIG. 5 is a top plan view showing an example of the construction and arrangement of the basic parts of the master switch of FIGS. 1 to 4.

If the photographer decides to actuate a release of the camera from the locked position, he may turn the handle 12 counter-clockwise while permitting the winding lever to remain in the retracted position. Alternatively, he may operate the winding lever as protracted by full playing movement, until the pin 6 comes just to abutting engagement against the edge 2a of the cutout of the collar 2. During this protracting process, the disc 9 is turned counterclockwise along with the handle 12 and gear 13, thereby the movable contact member A is brought into contact with the conductive tracks, c, and d, as shown in FIG. 5. A further counter-clockwise movement of the winding lever does not affect the release locking device of the invention.

The release locking device of the invention may be associated with the operation mode selector switch 114 of FIG. 1. An example of the construction and arrangement of the basic parts of the switch 114 is shown in FIGS. 2, 3 and 5. The switch 114 comprises a movable contact member B fixedly mounted on the common gear 13 of the master switch 100, and a fixed contact member in the form of a pair of conductive arcuate tracks, e, and, f, concentrical to each other and to the tracks, c, and, d, of the master switch 100, but retarded in angular position from the latter by a distance such that when the handle 12 is further slightly turned counter-clockwise from the lock released position shown in FIGS. 2 and 5, the movable contact member B comes to contact with the conductive tracks, e, and, f.

An additional feature of the release locking device of the invention is that when the camera is made to operate with an unexpectedly long exposure time, the photographer may turn the handle 12 in the direction toward the locked position, thereby the exposure control circuit can be reset at a point of time during the exposure operation.

What is claimed is:

1. In a camera of a type having a power source, a shutter, a shutter releasebutton coupled to the shutter, first and second switches, an electromagnetic shutter release device which initiates shutter operation and is connected to the power source through the first switch which closes in response to depression of a shutter release button, a photometric circuit which is connected to the power source through the second switch, a photographic information display circuit which displays an output of the photometric circuit, and a wind-up lever with a preparatory angle between its initial stowed position and its advancing position, a releasable locking device comprising:

a release lock switch connected between the power source and the first and second switches for disabling said electromagnetic release device and said photometric circuit as well as said photographing information display circuits when the release lock switch is off;

an operation member concentrically rotatable relative to said wind-up lever for opening and closing said release lock switch in dependence upon the rotary position of the operation member;

connecting means rotatable by said operation member and engagable with the lever when the operation member has opened the release lock switch, said connecting means when engaging the lever being shifted during rotation of the lever from the stowed to the advancing position between a position in which it engages said wind-up lever and another position in which it is disengaged from the wind-up lever, said operation member being moved by movement of said connecting means to the other position when said connecting means engages the lever to close said release lock switch and effect release from a locked condition.

2. A release locking device as in claim 1, wherein said connecting means includes a connector device and a fixed bearing having a helical groove, said connector device being rotatable on the fixed bearing and arranged to rotate and advance axially along the helical groove in said bearing in such a manner as axially to engage with said wind-up lever and to cause said operation member to open said release lock switch, said lever when engaging said connector device being shiftable to disengage the device from the wind-up lever at a position in which said connecting means causes the operation member to close said lock switch.

3. A device as in claim 1, further comprising an electrical self-timer of variable delay time, said operating member connecting said electrical self-timer with said release mechanism.

* * * * *